(12) United States Patent
Maliar et al.

(10) Patent No.: US 7,871,190 B2
(45) Date of Patent: Jan. 18, 2011

(54) HEADLIGHT COMPRISING A FIXED ATTACHED SUPPORT ELEMENT ON WHICH A REFLECTOR IS PIVOTALLY MOUNTED

(75) Inventors: Remi Maliar, Saint Saulve (FR); Cyril Herbin, Potelle (FR)

(73) Assignee: Valeo Vision, Bobigny (FR)

( * ) Notice: Subject to any disclaimer, the term of this patent is extended or adjusted under 35 U.S.C. 154(b) by 106 days.

(21) Appl. No.: 11/762,912

(22) Filed: Jun. 14, 2007

(65) Prior Publication Data
US 2007/0291500 A1 Dec. 20, 2007

(30) Foreign Application Priority Data
Jun. 15, 2006 (FR) .................................. 06 05363

(51) Int. Cl.
*F21V 7/00* (2006.01)
(52) U.S. Cl. .................. 362/514; 362/269; 362/282; 362/285; 362/296.01; 362/319; 362/341; 362/449
(58) Field of Classification Search ................ 362/269, 362/277, 282, 285, 296, 306, 319, 341, 433, 362/449, 514
See application file for complete search history.

(56) References Cited

U.S. PATENT DOCUMENTS

| 6,039,466 A | 3/2000 | Duchenne |
| 6,142,657 A | 11/2000 | Hinich |
| 6,513,960 B2 * | 2/2003 | Dinant .................. 362/549 |
| 6,960,006 B2 | 11/2005 | Abe |
| 2003/0223245 A1 | 12/2003 | Abe |

FOREIGN PATENT DOCUMENTS

| EP | 1050433 A1 | 11/2000 |
| EP | 1342618 A | 9/2003 |
| FR | 2757250 A1 | 6/1998 |

* cited by examiner

*Primary Examiner*—Jason Moon Han
(74) *Attorney, Agent, or Firm*—Jacox, Meckstroth & Jenkins

(57) ABSTRACT

A motor vehicle headlight that is able to emit a light beam on a roughly longitudinal axis and that comprises a housing that has a rear bottom and inside which there are arranged; at least one light source that is mounted fixedly in the housing; and at least one reflector that is mounted so as to pivot about a transverse axis with respect to the housing; wherein the headlight comprises an attached intermediate support element that is fixed inside the housing and on which the reflector is pivotally mounted.

11 Claims, 1 Drawing Sheet

US 7,871,190 B2

HEADLIGHT COMPRISING A FIXED ATTACHED SUPPORT ELEMENT ON WHICH A REFLECTOR IS PIVOTALLY MOUNTED

BACKGROUND OF THE INVENTION

1. Field of the Invention

The invention concerns a motor vehicle headlight that comprises a housing in which a fixed light source and a pivoting reflector are mounted.

2. Description of Related Art

Some motor vehicle headlights are equipped with means of adjusting the orientation of the light beam, in particular for elevation. The purpose of these adjustment means is in particular to adjust the light beam to a reference angular position, after the headlight is mounted in the vehicle.

It is known, in particular through the document FR-A-2.757.250, how to make this adjustment by pivoting only the reflector, the lamp being mounted fixedly in the rear bottom of the housing.

The reflector is generally mounted so as to pivot directly in the housing. However, the reflector can also be fixed in a cradle. It is thus the cradle that is mounted so as to pivot in the housing.

In order to mount the pivoting reflector in the housing, it is necessary to produce projecting or recessed counterparts in the internal faces of the internal lateral walls of the housing in order to receive the reflector pivotally.

The housing is generally produced in a single piece by molding. However, producing projecting or recessed counterparts by molding in the lateral walls of the housing requires the implementation of complex molding techniques necessitating the usage of expensive molds. This is because it is necessary to provide a mold comprising movable parts, also referred to as "shims", which must be taken away before the housing is removed from the mold.

In addition, the existing solutions have another drawback. This is because the lamp is mounted in a mounting orifice that is produced in the bottom of the housing while the reflector is mounted pivotally on the lateral walls of the housing. In order to optimize the intensity of the light beam emitted by the headlight, it is preferable for the lamp to be arranged precisely at the focus of the reflector. In other words, the mounting orifice must be positioned very precisely with respect to the counterparts for pivoting the reflector.

The production by molding of the mounting orifice and the counterparts with the housing does not make it possible to control their positions precisely. It frequently happens that the actual position of the lamp mounting orifice with respect to the pivoting counterparts for the reflector are shifted compared with the required nominal position. This is liable to give rise to a shift in the position of the lamp with respect to the focus of the reflector.

SUMMARY OF THE INVENTION

To resolve in particular these problems, the invention proposes a headlight of the type described previously, wherein the headlight comprises an attached intermediate support element that is fixed inside the housing and on which the reflector is pivotally mounted.

The invention concerns more particularly a motor vehicle headlight that is able to emit at least one light beam on a roughly longitudinal axis and that comprises a housing that has a rear bottom and inside which there are arranged:

at least one light source that is mounted fixedly in the housing, at least one reflector that is mounted so as to pivot about a transverse axis with respect to the housing.

According to other characteristics of the invention:

the support element is positioned in the housing by positioning means that are arranged on the bottom of the housing;

the support element comprises a web that is intended to be positioned at the bottom of the housing and two opposite lateral flanges that are able to receive the reflector pivotally;

the web of the support element is positioned at the bottom of the housing by fitting first fitting means carried by the web in second fitting means of complementary shape that are carried by the bottom of the housing;

the bottom comprises positioning studs of longitudinal axis that are able to be fitted in corresponding orifices in the web of the support element;

the web of the support element is fixed against the bottom of the housing by fixing means;

the light source is mounted in the housing by mounting means that are carried at least partly by the web of the support element so that the light source is positioned precisely with respect to the support element;

the light source is a lamp that comprises first bayonet-mounting means that cooperate with complementary second bayonet-mounting means that are carried at least partly by the web of the support element;

the second bayonet-mounting means comprise an aperture produced in the web that is arranged so as to coincide with an orifice produced in the bottom of the housing, the first bayonet-mounting means for the lamp being able to be mounted in the aperture while longitudinally gripping the web of the support element and the bottom of the housing;

the fixing means for the support element are arranged on the periphery of the aperture of the web of the support element;

the support element is fixed to the bottom of the housing by crimping;

the support element comprises a heat screen that prevents the heat emitted by the light source from reaching certain areas of the housing;

the support element comprises at least one wing forming a heat screen;

the housing is produced in a single piece by molding;

the support element is produced from sheet metal.

Other characteristics and advantages will emerge from a reading of the following detailed description, for an understanding of which reference will be made to the accompanying drawings, among which:

DETAILED DESCRIPTION OF THE INVENTION

Figure 1:
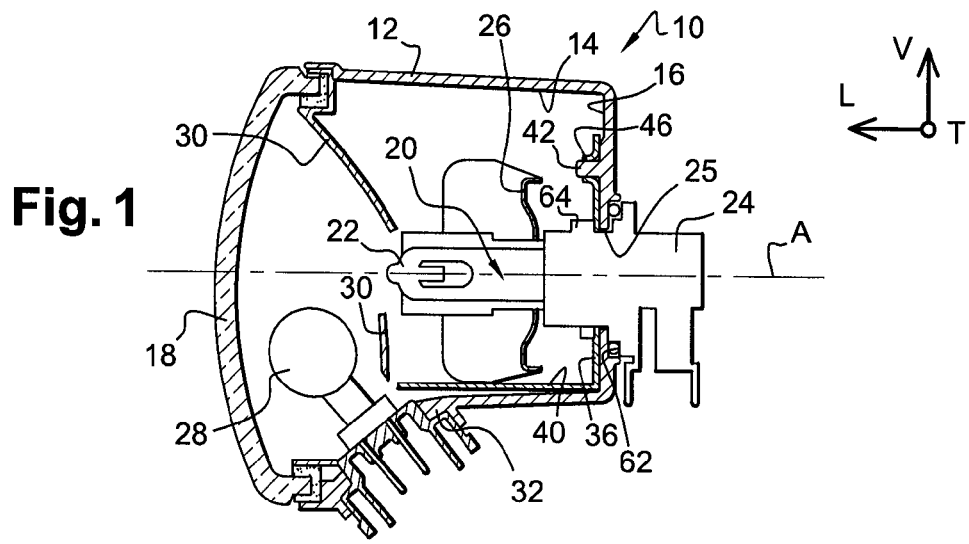
FIG. 1 is a view in vertical axial section that depicts a headlight in which there are mounted a pivoting reflector and a lamp fixed to a support element according to the teachings of the invention.

For the remainder of the description, the following orientations will be adopted non-limitingly: longitudinal, directed from rear to front, vertical, directed from bottom to top, and transverse, which are indicated by the trihedron "L, V, T" in FIG. 1.

Hereinafter, identical, analogous or similar elements will be indicated by the same reference numbers.

FIG. 1 depicts a motor vehicle headlight 10. It is a case here of a headlight 10 that is arranged at the front of the motor vehicle.

The headlight 10 comprises a housing 12, roughly cylindrical in shape, of longitudinal axis "A". The housing 12 comprises a cylindrical lateral wall 14 and a rear vertical transverse bottom 16. The housing 12 is closed sealingly towards the front by a front protective window 18 that extends in a vertical transverse plane.

The housing 12 is here produced in a single piece by molding, for example, from plastics material.

The headlight 10 is able to emit at least one light beam roughly along the longitudinal axis "A".

The housing 12 comprises here two optical assemblies that are able to fulfill two different light functions. For example, the first optical assembly fulfills a "fog light" function while the second optical assembly fulfills a "daytime light" function.

The first optical assembly comprises a first light source that is here a halogen lamp 20. The halogen lamp 20 comprises a front bulb 22 and a rear cap 24.

The cap 24 comprises a cylindrical body of revolution with a longitudinal axis. The cap 24 is fixed to the bottom 16 of the housing 12. More particularly, the bottom 16 of the housing 12 is perforated in an orifice 25 in which the cap 24 is fixed by bayonet-mounting means that will be described in more detail hereinafter. The cap 24 thus comprises a front portion that is arranged inside the housing 12 and a rear portion that is arranged outside the housing 12. The rear portion of the cap comprises in particular electrical connection means.

Figure 2:
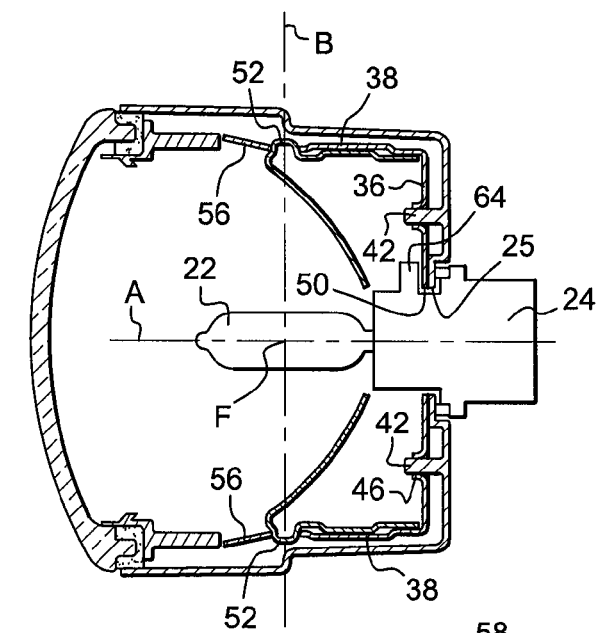
FIG. 2 is a view in horizontal axial section that shows the headlight of FIG. 1.

The first optical assembly also comprises a first reflector 26 that is mounted so as to pivot in the housing 12 about a transverse axis "B", as shown in FIG. 2.

According to a variant of the invention that is not shown, the first reflector 26 is fixed to a cradle, and the cradle is mounted so as to pivot in the housing 12.

The first reflector 26 has a roughly paraboloid reflected concave internal face that has a roughly longitudinal optical axis "O" that is secant with the pivot axis "B". In the example shown in FIGS. 1 and 2, the optical axis "O" is merged with the axis "A" of the housing 12.

As illustrated in FIG. 2, an optical focus "F" of the first reflector 26 is arranged on the optical axis "O". The focus "F" is more particularly arranged at the intersection of the optical axis "O" and the pivot axis "B".

The bulb 22 of the halogen lamp 20 is arranged at the optical focus "F" of the first reflector 26 so that the rays emitted by the lamp 20 in the direction of the first reflector 26 are reflected in the direction of the optical axis "O".

The first reflector 26 being mounted so as to pivot in the housing 12, the optical axis "O" of the headlight 10 is able to occupy several angular positions on each side of the longitudinal axis "A" of the housing 12.

As shown in FIG. 1, the second optical assembly of the headlight 10 comprises a second light source that is here an incandescent lamp 28 and a second reflector 30 fixed with respect to the housing 12 that is arranged at the front of the first pivoting reflector 26. The second reflector 30 has a central orifice for passage of the light beam emitted by the first optical assembly. The incandescent lamp 28 is here arranged in a bottom portion 32 of the lateral wall 14 of the housing 12.

This second optical assembly is not essential for implementing the invention. It will therefore not be described in more detail in the remainder of the description.

To simplify understanding of the remainder of the description, the terms "lamp" and "reflector" will relate solely to the first light source 20 and to the first reflector 26.

According to a variant of the invention, the housing 12 has only a single optical assembly similar or identical to the first optical assembly described above.

According to the teachings of the invention, the headlight 10 comprises an attached intermediate support element 34 that is mounted fixedly in the housing 12. The reflector 26 is mounted so as to pivot on the support element 34.

Figure 3:
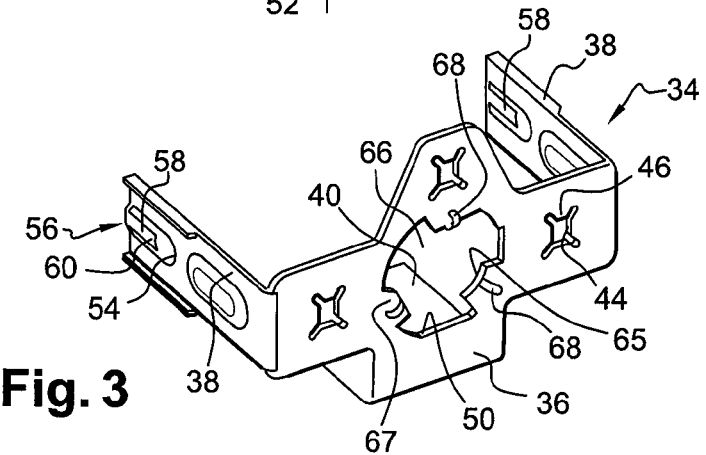
FIG. 3 is a view in perspective that shows the support element of FIG. 1.

The support element 34 is shown in more detail in FIG. 3. It comprises a rear central web 36 that lies in a vertical transverse plane. Two lateral flanges 38 extend towards the front in a vertical longitudinal plane from the two transverse end edges of the web 36. The two flanges 38 are slightly divergent to enable the various elements making up the headlight to be assembled.

A horizontal bottom wing 40 extends forwards from a bottom end edge of the web 36.

The support element 34 is here produced in a single piece from cropped and bent sheet metal.

As shown in FIGS. 1 and 2, the web 36 of the support element 12 is arranged against the internal face of the bottom 16 of the housing 12, so that the flanges 38 extend along lateral walls 14 of the housing 12. The flanges 38 are not necessarily in contact with the lateral walls 14 of the housing 12.

The headlight 10 comprises means of positioning the support element 34 against the bottom 16 of the housing 12. For this purpose, the bottom of the housing 12 comprises here three positioning studs 42 that extend longitudinally forwards from the internal face of the bottom 16 of the housing 12. The positioning studs 42 are not aligned.

The web 36 of the support element 34 comprises positioning orifices 44 that are arranged to match the positioning studs 42 so that the positioning studs 42 can be inserted in the positioning orifices 44.

As shown in FIG. 3, the positioning orifices 44 of the web 36 have flexible elastic lugs 46 that extend radially from the periphery of the orifices 44 towards their center in the same plane as the web 36. These lugs 46 are here four in number per positioning orifice 44 and are distributed regularly about each positioning orifice 44.

The lugs 46 are arranged so that, when the positioning stud 42 is inserted longitudinally in the associated positioning orifice 44, the free end of the lugs 46 is pushed forwards, thus causing the lugs 46 to flex. The lugs 46 being returned elastically towards their initial position, they grip the stud 42, as shown in FIGS. 1 and 2. The stud 42 is thus centered in the positioning orifice 44.

In addition, the gripping of the lugs 46 on the stud 42 makes it possible to offer a resistance to a forward longitudinal movement of the support element 34 with respect to the housing 12 when the support element 34 is positioned in the housing 12. The support element 34 is thus held in position until it is fixed on the housing 12.

To enable the reflector 26 to be pivotally mounted on the support element 34, the reflector 26 comprises lateral swivels 52 that are arranged transversely on each side of the reflector 26 coaxially with the pivot axis "B". Each flange 38 of the support element 34 carries a bearing 54 of pivot axis "B". The bearings 54 are here formed by holes that pass through the flanges 38. The bearings 54 are arranged opposite each other so as to receive the swivels 52 pivotally.

The reflector 26 is mounted between the flanges 38 of the support element 34 by elastic fitting-together means with complementary shapes. Thus the free front end of each flange 38 has a longitudinal groove, the rear bottom of which delimits the bearing 5 towards the rear. A flexible elastic blade 56 is mounted in the groove so that a front end 58 of each blade 56 is connected by a connection of the embedding type to the associated flange 38, whilst the rear end 60 of the blade 56 is free. A rear end 60 of the blade 56 delimits the bearing 54 of the flange 38 towards the front.

The blades 56 are mounted so as to be inclined with respect to the longitudinal direction "A". Thus the front ends 58 of the blades 56 are transversely distant from each other by a distance that is at least equal to the distance that transversely separates the free ends of the swivels 52 of the reflector 26. In addition, the rear ends 60 of the two blades 56 are transversely distant by a distance that is less than the distance that transversely separates the free ends of the swivels 52 of the reflector 26.

When the reflector 26 is mounted, the blades 56 thus form ramps that make it possible to guide the swivels 52 of the reflector 26 as far as the bearings 54 in a rearward longitudinal sliding movement. During this operation, the blades 56 then deform elastically in flexion in a horizontal plane so that their rear ends move away from each other to enable the swivels 52 to pass. Then, when the swivels 52 are inserted in the bearings 54, the blades are elastically returned to their original position, thus trapping the reflector 26 in the bearings 54.

According to another aspect of the invention, the cap 24 is mounted fixedly at the bottom 16 of the housing 12 by mounting means that are carried at least partly by the web 36 of the support element 34 so that the bulb 22 is positioned precisely with respect to the support element 34 and consequently with respect to the reflector 26.

The cap 24 is mounted by bayonet-mounting means. For this purpose, the cap 24 carries first bayonet-mounting means that are able to cooperate with second bayonet-mounting means that are carried by the housing 12 and by the support element 34.

Thus the first bayonet-mounting means of the cap 24 comprise a radial collar 62 that carries a shoulder face that is oriented radially towards the front. The cap 24 also comprises three fingers 64 that extend radially outwards from the body of the cap 24. The fingers 64 are here three in number and are distributed regularly over the periphery of the cap 24. The fingers 64 are arranged at the front of the shoulder face 62 so that a rear face of the fingers is arranged opposite the shoulder face 62. The fingers 64 are separated from the shoulder face 62 by a longitudinal distance that is substantially equal to the sum of the thicknesses of the bottom 64 and of the web 36.

The second bayonet-mounting means are carried on the one hand by the bottom 16 of the housing 12 and on the other hand by the web 36 of the support element 34.

Thus the contour of the orifice 25 in the bottom 16 of the housing 12 has a circular shape with a diameter slightly greater than the diameter of the cylindrical body of the cap 24 but less than that of the diameter of the shoulder face 62. The orifice 25 also has three cutouts (not shown) that are arranged in agreement with the fingers 64 to enable the fingers 64 to pass when the cap 24 is introduced longitudinally from rear to front in the orifice 25. The cutouts thus delimit three tongues (not shown) that extend radially towards the inside of the orifice 25 in alternation with the cutouts around the orifice 25.

The web 36 has an aperture 50 that is arranged to match the orifice 25 in the housing 12. The aperture 50 enables the cap 24 to pass. The contour of the aperture 50 of the support element 34 has a shape similar to that of the contour of the orifice 25. Thus the aperture 50 also has a circular-shaped contour 65 comprising three cutouts 66 to enable the fingers 64 to pass and three tongues 67 that extend radially towards the inside of the aperture 50 in alternation with the cutouts 66. The free ends of the tongues 67 thus form the circular contour 65 of the aperture 50. The cutouts 66 of the aperture 50 are arranged to match the cutouts of the orifice 25 in the bottom 16.

However, the diameter of the circular contour 65 of the aperture 50 is slightly less than the internal diameter of the orifice 25. The internal diameter of the aperture 50 is substantially equal to the diameter of the cylindrical body of the cap 24. Thus an internal free end of the tongues 67 of the support element 34 projects into the orifice 25 of the housing 12 with respect to the tongues of the bottom 16 when the support element 34 is arranged in the housing 12.

In addition, the front face of the web 36 has angular stops (not shown) that are intended to cooperate with the fingers 64 in order to block the rotation of the cap 24 with respect to the housing 12 about a longitudinal axis when the cap 24 is in an angular position mounted on the housing 12. The front face of the web 36 also comprises protrusions (not shown) to lock the cap 24 in its mounted angular position.

According to a variant, not shown, of the invention, the bayonet-mounting means are carried solely by the support element 34.

In addition, the support element 34 is fixed to the bottom of the housing 12. The support element 34 is advantageously fixed to the periphery of the orifice 25 for passage of the cap 24.

Crimping lugs 68, which are here three in number, extend radially inwards from the periphery of the aperture 50. The crimping lugs 68 extend more particularly from the free end of the tongues 67 of the aperture 50. The crimping lugs 68 are intended to be folded through the orifice 25 of the housing 12 against the external face of the bottom 16. The crimping lugs 68 thus grip the free end of the tongues of the bottom 16 of the housing 12 so as to fix the support element 34 to the housing 12.

When the headlight 10 is mounted, the support element 34 is first of all positioned in the housing 12. The support element 34 is inserted in a longitudinal direction towards the rear until the web 36 is pressed against the bottom 16. During this operation, the positioning studs 42 are then inserted in the positioning orifices 44. The free ends of the lugs 46 are pushed longitudinally forwards by the positioning studs 42, which causes the lugs 46 to flex. The studs 42 are thus gripped by the lugs 46 so that the studs 42 are centered in the orifices 44, and so that the support element 34 is held in position in the housing 12.

Then the support element 34 is fixed in the housing 12 by folding the crimping lugs towards the rear so as to grip the edge of the orifice 25 in the housing 12.

The support element 34 is thus immobilized longitudinally with respect to the housing 12 by the crimping lug 68 and is rotationally immobilized about the longitudinal axis by the positioning studs 42.

Next the reflector 26 is mounted on the support element 34. The reflector 26 is inserted through the front opening of the housing 12 in a rearward longitudinal movement so that the swivels 52 are engaged in the front grooves of the flanges 38, between the two blades 56. The blades 56 are flexed by the passage of the swivels and then, when the swivels are housed in the bearings 54, the blades are returned elastically into their original position so as to trap the swivels 52 in the bearings 54.

Then the cap 24, previously equipped with the lamp 28, is then mounted in the housing 12. For this purpose, the cap is arranged at the rear of the housing 12, opposite the orifice 25, in an angular position such that the fingers 64 match the cutouts.

The lamp and then a first front portion of the cap 24 are inserted longitudinally from rear to front inside the housing 12 by means of the orifice 25 and aperture 50 until the shoulder face 62 is in abutment against the external face of the bottom 16 of the housing 12. To permit this insertion, the cap 24 has been oriented in an angular position about its longitudinal axis so that the fingers 64 coincide with the cutouts 66. The fingers 64 are then arranged inside the housing 12.

Then the cap 24 is turned about its longitudinal axis so that the fingers 64 engage in front of the tongues 67 of the web 36 until the fingers are in abutment. The tongues of the web 36 and the housing 12 are thus gripped axially between the fingers 64 on the one hand and the shoulder face 62 on the other hand.

In the course of the rotation movement of the cap 24, the fingers 64 pass over the protrusions of the web 36, deforming elastically so as to hold the cap 24 in angular abutment.

In addition, the free ends of the tongues 67 of the web 36 project into the orifice 25 in the housing 12, and the cylindrical body of the cap 24 is in abutment on the free end of the tongues 67 of the web 36. Thus the cap 24 is positioned in a vertical longitudinal plane in the housing 12, taking the support element 34 as a reference.

In addition, the cap 24 is also positioned longitudinally with respect to the support element 34 by the fingers 64, which are in longitudinal abutment against the front face of the web 36.

The cap 24 and reflector 26 are therefore both positioned with respect to the support element 34. The support element 34 being fabricated from sheet metal by the use of known and well controlled methods, for example by bending and cropping, makes it possible to obtain reliable dimensions with a very small tolerance. Consequently the cap 24 is always well positioned with respect to the reflector 26 independently of any dispersions found in the dimensions of the housing 12 obtained by molding.

In addition, by virtue of the support element 34, it is no longer necessary to provide complex shapes for the internal lateral walls of the housing 12 during molding. This is because the support element 34 is positioned and fixed at the bottom 16 of the housing 12. However, it is easy to produce the positioning studs 42 for the housing 12 by means of a simple mold.

In addition, the fixing of the support element 34 on the orifice 25 of the housing 12 advantageously makes it possible to perfectly immobilize the aperture 50 with respect to the orifice 25 in order to facilitate the mounting of the cap 24 in the aperture 50 and orifice 25.

In addition, the wing 40 of the support element 34 is interposed between a bottom portion of the lateral wall 14 of the housing 12 and the bulb 22 of the lamp 20. The wing 40 thus forms a heat screen that prevents the heat emitted by the lamp 20 from heating certain parts of the housing 12.

While the form of apparatus herein described constitute a preferred embodiment of this invention, it is to be understood that the invention is not limited to this precise form of apparatus, and that changes may be made therein without departing from the scope of the invention which is defined in the appended claims.

What is claimed is:

1. A motor vehicle headlight that is able to emit at least one light beam on a roughly longitudinal axis and that comprises a housing that has a bottom, and inside which there are arranged:
    at least one light source that is mounted fixedly in the housing; and
    at least one reflector that is mounted so as to pivot about a transverse axis with respect to the housing;
    wherein the motor vehicle headlight comprises an intermediate support element that is fixed inside the housing and on which said at least one reflector is pivotally mounted, wherein said intermediate support comprises a first lateral flange and a second lateral flange that is generally opposed to said first lateral flange, said at least one reflector being pivotally mounted between said first and second lateral flanges;
    said first lateral flange and said second lateral flange comprising a first bearing and a second bearing, respectively, and said at least one reflector comprising a first swivel and a second swivel that are received in or engage said first and second bearings, respectively, to permit said pivoting about said transverse axis;
    wherein said intermediate support element is positioned in the housing by positioning means arranged on the bottom of the housing;
    wherein said intermediate support element comprises a web that is intended to be positioned at the bottom of the housing and said first and second lateral flanges are adapted to receive the reflector pivotally;
    wherein the web of said intermediate support element is positioned at the bottom of the housing by fitting first fitting means carried by said web in second fitting means of complementary shape that are carried by the bottom of the housing; and
    wherein the bottom comprises positioning studs of longitudinal axis that are able to be fitted in corresponding orifices in said web of said intermediate support element.

2. The motor vehicle headlight according to claim 1, wherein said web of said intermediate support element is fixed against the bottom of the housing by fixing means.

3. The motor vehicle headlight according to claim 2, wherein a light source is mounted in the housing by mounting means that are carried at least partly by said web of said intermediate support element so that said light source is positioned precisely with respect to said intermediate support element.

4. The motor vehicle headlight according to claim 1, wherein said intermediate support element comprises a heat screen that prevents the heat emitted by said at least one light source from reaching certain areas of the housing.

5. The motor vehicle headlight according to claim 4, wherein said intermediate support element comprises at least one wing forming the heat screen.

6. The motor vehicle headlight according to claim 1, wherein said housing is produced in a single piece by molding.

7. The motor vehicle headlight according to claim 1, wherein said intermediate support element is produced from sheet metal.

8. A motor vehicle headlight that is able to emit at least one light beam on a roughly longitudinal axis and that comprises a housing that has a bottom, and inside which there are arranged:
    at least one light source that is mounted fixedly in the housing; and at least one reflector that is mounted so as to pivot about a transverse axis with respect to the housing;

wherein the motor vehicle headlight comprises an intermediate support element that is fixed inside the housing and on which said at least one reflector is pivotally mounted, wherein said intermediate support comprises a first lateral flange and a second lateral flange that is generally opposed to said first lateral flange, said at least one reflector being pivotally mounted between said first and second lateral flanges;

said first lateral flange and said second lateral flange comprising a first bearing and a second bearing, respectively, and said at least one reflector comprising a first swivel and a second swivel that are received in or engage said first and second bearings, respectively, to permit said pivoting about said transverse axis; and wherein said at least one light source is a lamp that comprises first bayonet-mounting means that cooperate with a complementary second bayonet-mounting means that are carried at least partly by a web of said intermediate support element.

9. The motor vehicle headlight according to claim 8, wherein said complementary second bayonet-mounting means comprise an aperture produced in said web that is arranged so as to coincide with an orifice produced in the bottom of the housing, said first bayonet-mounting means for said lamp being able to be mounted in said aperture while longitudinally gripping said web of said intermediate support element and the bottom of the housing.

10. The motor vehicle headlight according to claim 9, wherein fixing means for said intermediate support element are arranged on a periphery of an orifice in the web of said intermediate support element.

11. The motor vehicle headlight according to claim 10, wherein said intermediate support element is fixed to the bottom of the housing by crimping.

* * * * *